US005686168A

United States Patent [19]

Laurent et al.

[11] Patent Number: 5,686,168

[45] Date of Patent: Nov. 11, 1997

[54] METHOD OF EMBOSSING A SHEET HAVING ONE OR MORE PLIES, AND EMBOSSED PAPER SHEET

[75] Inventors: Pierre Laurent, Colmar; Rémy Ruppel, Durrenentzen; Joël Hungler, Urschenheim, all of France

[73] Assignee: James River, Kunheim, France

[21] Appl. No.: 491,895

[22] PCT Filed: Jan. 13, 1994

[86] PCT No.: PCT/FR94/00042

§ 371 Date: Jul. 14, 1995

§ 102(e) Date: Jul. 14, 1995

[87] PCT Pub. No.: WO94/15776

PCT Pub. Date: Jul. 21, 1994

[30] Foreign Application Priority Data

Jan. 15, 1993 [FR] France .................................. 93 00366

[51] Int. Cl.$^6$ ...................................................... B32B 31/08

[52] U.S. Cl. ......................... 428/179; 156/209; 156/553; 156/555; 156/582

[58] Field of Search .................................... 156/209, 205, 156/553, 555, 470, 471, 582, 219, 472; 428/179, 182, 184, 284; 162/111, 112

[56] References Cited

U.S. PATENT DOCUMENTS

| | | | |
|---|---|---|---|
| 3,708,366 | 1/1973 | Donnelly | 156/210 |
| 4,101,367 | 7/1978 | Maier | 156/582 |
| 4,325,773 | 4/1982 | Schulz | 156/471 |
| 4,913,911 | 4/1990 | Wildt | 156/209 |
| 5,468,323 | 11/1995 | McNeil | 156/553 |

FOREIGN PATENT DOCUMENTS

| | | |
|---|---|---|
| 498623 | 8/1992 | European Pat. Off. . |
| 499942 | 8/1992 | European Pat. Off. . |

*Primary Examiner*—Michele K. Yoder
*Attorney, Agent, or Firm*—Breiner & Breiner

[57] ABSTRACT

A method for embossing a sheet of creped paper composed of at least one ply, whereby the sheet is engaged between two metallic cylinders fitted with protrusions and driven in rotation in a conventional manner and mesh with each other while having a play e1 between the tops of the protrusions of one cylinder and the opposite surface of the other cylinder, and a play e2 between the slopes of two adjacent protrusions wherein e1 and e2 are determined in the direction transverse to the direction of paper advance in such a manner that the ratio of e1/e2 is between 0.8 and 1.

9 Claims, 3 Drawing Sheets

METHOD OF EMBOSSING A SHEET HAVING ONE OR MORE PLIES, AND EMBOSSED PAPER SHEET

The invention concerns fiber products, in particular sanitary and household papers made of cellulose tissue. It further applies to a method for embossing a sheet or web comprising one or more plies and to an embossed paper sheet or web useful as a sanitary paper, napkin or general purpose towel.

Bulky products are desired in the household and sanitary paper industry because this feature is linked in the user's mind to absorptivity, softness and good appearance. Bulk is increased by embossing the paper and, where desired, by making a sheet of two or more plies.

U.S. Pat. No. 3,556,907 discloses a paper manufacturing mode, in particular, comprising two plies or elementary foils of creped paper. The plies are embossed separately and comprise protrusions or bosses on one side. The plies are combined by moving the sides closer together and nesting the protrusions. The equipment includes two embossing units, each with one steel and one rubber cylinder, and further a laminator cylinder distinct from the embossing cylinders. The laminator cylinder is a rubber cylinder and cooperates with one of the metal cylinders to assure ply combination. The sheet that was embossed by the cylinder out of contact with the laminator cylinder is slightly, but noticeably, warped on account of its stretchability when it is lifted off the cylinder to pass underneath the laminator cylinder. As a result, sufficient space must be provided between the protrusions to permit them to nest. Thus, the permissible maximum density is restricted. High density would result in protrusion straddling. Even though said patent allows for as many as 30 protrusions per $cm^2$, in practice, the maximum has been found to be 12 protrusions per $cm^2$.

U.S. Pat. No. 3,940,529 describes a two-ply absorbent product. Each ply evinces an embossed pattern with shallows and rises. The rises on a ply are situated between the rises of the other ply and bonding is by mechanically joining the slopes between the trough and the top of the rises. This mechanical junction lessens the strength because of the local sheet perforation. The equipment comprises two metallic embossing cylinders fitted with rises or pegs meshing with each other. The spacing between the elementary rises is less than their width so that the sheet is strongly compressed along the slopes of theses rises and can be joined.

U.S. Pat. No. 4,325,773 describes a procedure for joining two plies which previously were separately embossed. The two embossing cylinders mesh with each other and ensure combination of the plies. It should be noted in this respect that the embossing pattern consists of elongated rises which are comparatively far away from each other.

U.S. Pat. No. 4,759,967 describes an embossing procedure for a multiple sheet consisting of mutually bonding the plies to each other by means of atomized adhesive and then embossing the sheet between two metallic cylinders. The embossing patterns on the cylinders consists of cavities alternating with rise zones relative to the surface plane. The two cylinders mesh each other, the rises of one cylinder engaging the recesses of the other. Be it noted that these cylinders are engraved in a conjugate manner.

Study of this prior art has show that to date, the apparent thickness of the embossed products, that is, the distance between the two sides of the sheet, is not constant.

Regarding the nested-type products, the thickness e1 in the ply bonding zone is equal to the sum of the ply thicknesses but is less than the thickness e2 of the zones between the bonding areas which form air pockets.

The object of the invention is an embossing manufacturing method for a sheet composed of at least one ply whereby the sheet is inserted between two metallic cylinders which are fitted with protrusions and driven in rotation by known means and which also mesh with each other with a play e1 between the top of the protrusions of one cylinder and the surface of the opposite cylinder and with a play e2 between the slopes of two adjacent protrusions. This method is characterized in that e1 and e2 are set in a direction transverse to the direction of machine advance so that the ratio e1/e2 is between 0.8 and 1.

Due to the invention, a sheet is now made available which combines the advantage of rubber/steel embossing with steel/steel embossing, that is, a sheet in which the thickness is substantially uniform while nevertheless offering improved softness on account of the calendering at the top of the sheet's rise zones.

In another feature of the invention, a sheet with at least two plies is manufactured by making at least one of the plies hug the surface of one of the cylinders by applying the ply(s) by means of a rubber cylinder. In particular, the two plies can be mutually matched beforehand and then glued by depositing an adhesive on at least part of the rise zones on the cylinders before the plies are combined.

In another feature of the invention, the play e1 is between 5/100 and 5/10 mm and at most is equal to the sum of the thicknesses of the plies constituting the sheet. As a result, a sheet having at least two plies is achieved which, relative to a sheet of the nested prior art, can comprise a larger number of embossments. Improved crushing strength is thus achieved. Moreover, for the same sheet length, the diameter can be reduced so that storage is more compact. Further, the calendering generated by the contact with the two metallic cylinders provides softness to the touch.

The invention is elucidated below in relation to the drawings.

Figure 1:
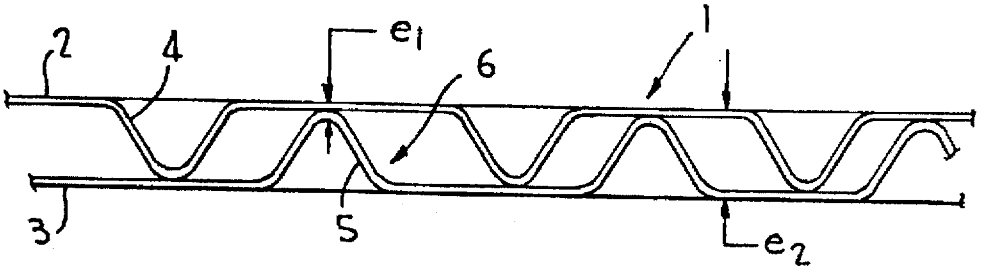
FIG. 1 (PRIOR ART)
FIG. 1 shows a cross-section of a two-ply sheet of the prior art.

FIG. 1 is a cross-section of a sheet 1 of the prior art having two plies 2 and 3 nested in each other. The manufacture of such a sheet is disclosed, for example, in U.S. Pat. No. 3,556,907. Ply 2 comprises bosses 4 made by embossing. These bosses are regularly spaced apart from each other and point toward ply 3 which comprises bosses 5 pointing toward ply 2. The latter bosses nest between bosses 4. Bosses 4 and 5 are sufficiently spaced apart to subtend between them a gap 6.

The web thickness varies between a minimum e1 where the bosses of one ply contact the opposite ply and a value e2 between two adjacent bosses. In practice, as regards absorbent paper such as used in an all-purpose towel, the ratio e1/e2 is low, approximately 0.1. e1 corresponds to the thickness of the two creped, absorbing paper plies, for example 0.2 mm, and e2 is measured as 1.85 mm.

Figure 2:
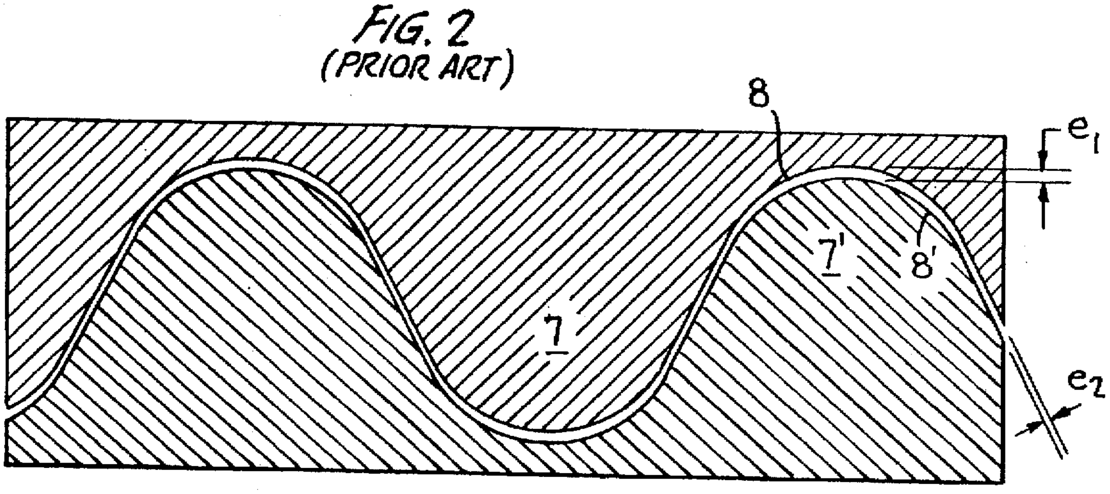
FIG. 2 (PRIOR ART)
FIG. 2 is a cross-section of two combined conjugate cylinders of the prior art.

It is furthermore known to emboss by engaging a sheet to be embossed between two mutually meshing metallic cylinders. To the knowledge of applicants, in this art, the cylinders are engraved in such a way that the products made with them will evince non-uniform thicknesses. FIG. 2 cross-sectionally shows the embossing gap between two cylinders in a plane passing through their axis.

The metallic cylinder 7 comprises radial protrusions 8 regularly distributed over the surface. Similarly, the cylinder 7' comprises protrusions 8' with the same dimensions.

The conventional engraving method for such cylinder pairs is to engrave a first cylinder using a knurling tool made of a material harder than the cylinder. After this first cylinder has been made, the second cylinder is engraved by means of the first cylinder so as to create two conjugate patterns which perfectly mesh into one another.

When the two cylinders are combined in an embossing machine, they are placed parallel to each other with a corresponding play substantially equal to the thickness of the web to be embossed. The section of the embossing gap between the two cylinders shown in FIG. 2 indicates that the distance e1 between the top of a boss and the bottom of the engraving opposite the boss is larger than the distance e2 between the slopes of two adjacent protrusions when measured substantially at boss mid-height.

Figure 3:
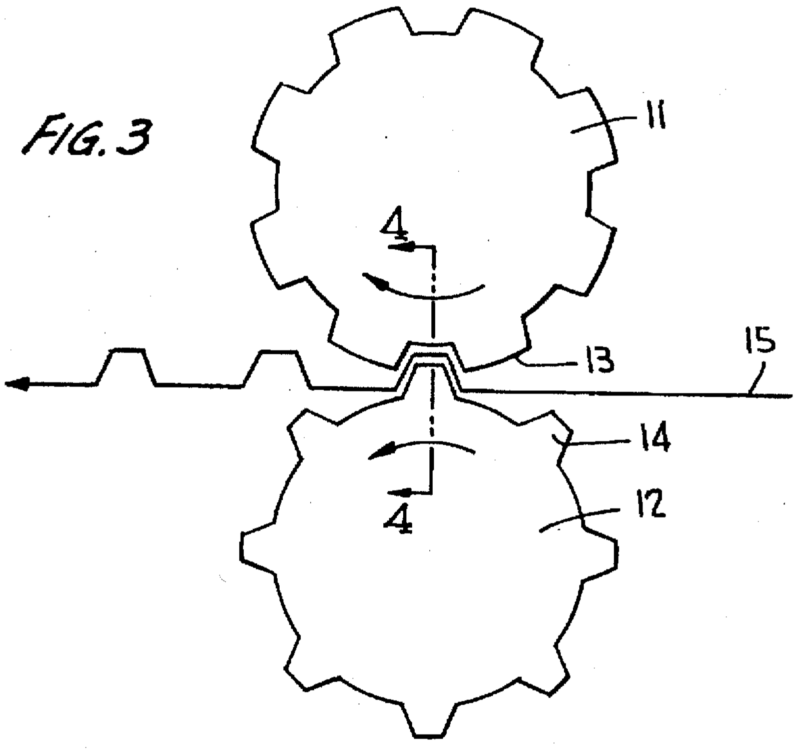
FIG. 3 shows equipment with which to carry out the invention to manufacture a sheet having one or more previously bonded plies.

FIG. 3 schematically shows embossing equipment 10 for a single-ply sheet or for a previously bonded multiple-foil, comprising two parallel cylinders 11, 12 driven conventionally in the direction of the arrows. Cylinders 11, 12 are metallic or of another material and are fitted on their surfaces with protrusions 13, 14 extending radially outward.

These cylinders are relatively positioned so that they mutually mesh. Protrusions 13 of cylinder 11 insert themselves between protrusions 14 of cylinder 12 inside the embossing gap. The creped-paper sheet 15 is engaged between cylinders 11 and 12 and, when exiting the cylinders, evinces on each side bosses corresponding to the cylinder protrusions.

Figure 4:
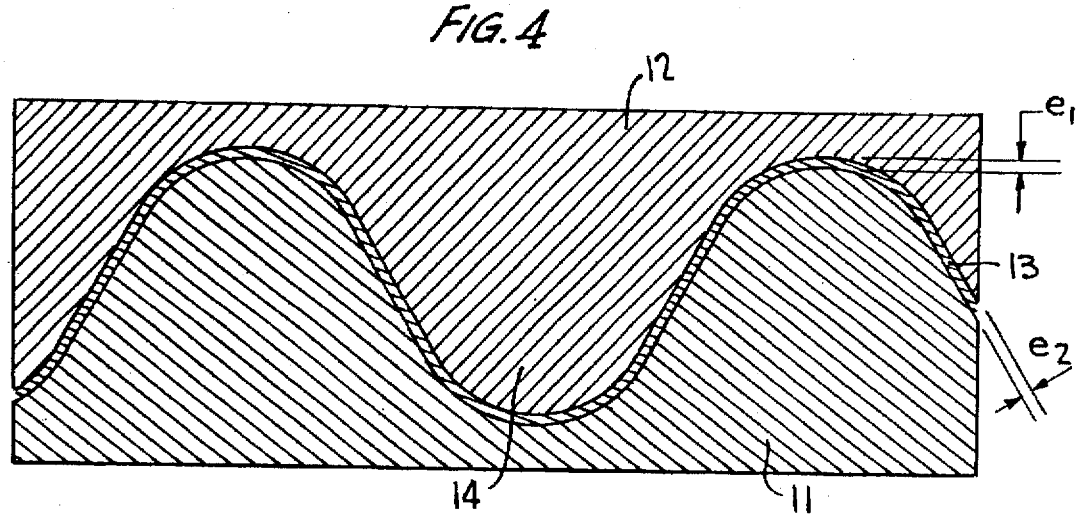
FIG. 4 is a cross-section along IV—IV of FIG. 3.

FIG. 4 is an enlarged view of a cross-section in a plane through the axis of the two cylinders and shows a protrusion configuration of the invention.

The protrusions are identical on both cylinders and are distributed in the same pattern with identical repeats in the direction of advance in the transverse direction. The direction of advance is the forward sheet motion and is perpendicular to the creping lines. The transverse direction is defined as subtending an angle approximately 45° to the normal to the direction of advance. In the particular case shown, the transverse pattern direction is perpendicular to the direction of advance.

The protrusion height is between 0.5 and 1.5 mm.

As shown in the figure, the embossing gap between the two cylinders equals e1 between the tops of the protrusions 13 of the first cylinder and the engraving bottom between the two adjacent protrusions 14 of the second cylinder. This embossing gap equals e2 between the slopes of two adjacent protrusions 13 and 14. It is assumed for simplicity that the protrusions are symmetrical relative to their axes.

The gap e1 depends on the chosen spacing between the two cylinders. The magnitude of e2 in turn depends on the geometric protrusion parameters. Illustratively, given a repeat P for a pattern, it will depend on the angle $\alpha$ at the protrusion tops and on the protrusion widths L at said tops. In practice, the angle $\alpha$ is between 25° and 35° and the width at the top is between 0.1 and 1.2 mm.

In the invention, e1 and e2 are set in such a manner that the ratio e1/e2 is less than or equal to unity and shall exceed 0.8. Preferably, the value is selected to be at most equal to the thickness of the sheet to be embossed. Thereby, sheet calendering at the top of the bosses so made is assured and thus improved softness to the touch is achieved.

Figure 5:
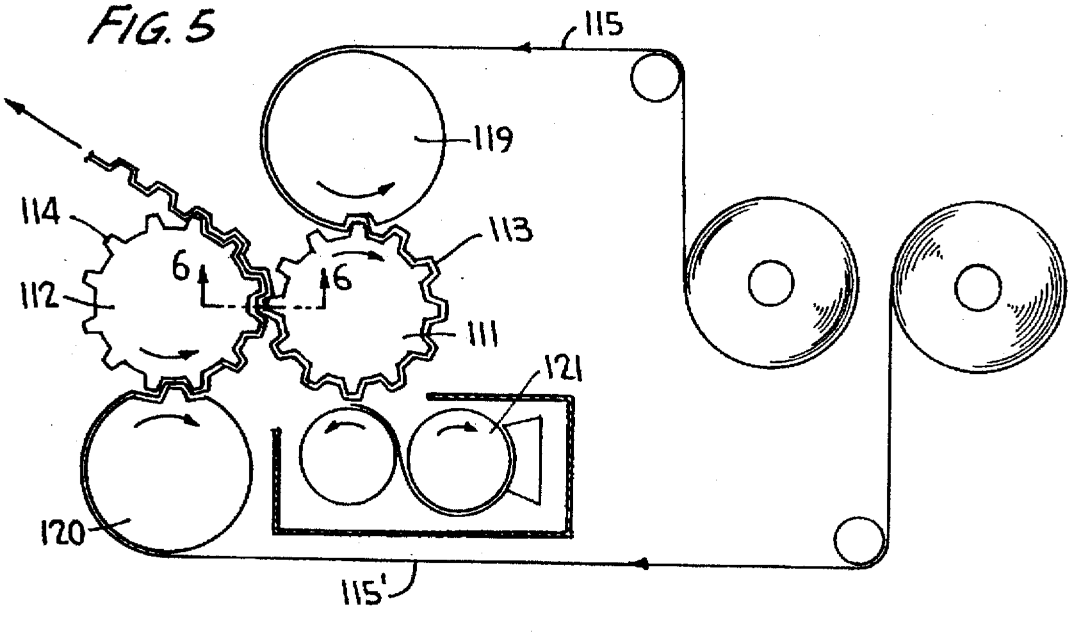
FIG. 5 shows equipment with which to implement the invention to manufacture a sheet having at least two plies.

FIG. 5 shows embossing equipment for making two-ply sheets. This equipment per se is conventional and comprises two cylinders 111, 112 made of metal or of an equivalent material, arrayed in parallel, being conventionally driven in the directions shown by the arrows. As in the previous embodiment, cylinders 111 and 112 are fitted with protrusions 113, 114 extending radially outward and meshing with one another. A compressing cylinder 119, 120 clad with rubber or another elastomer material is assigned to each cylinder 111 and 112. Two creped paper plies 115, 115' are respectively engaged between cylinders 111 and 119 and cylinders 112 and 120 and are pressed against their respective embossing cylinder which follows their topology. A conventional bonding device 121 deposits an adhesive on the tops of the rise zones of the ply 115 and thereupon the two plies are moved into the embossing gap between the two cylinders 111 and 112 where they combine into one sheet. This sheet 115–115' thereafter is processed into the final product, such as a household towel.

Figure 6:
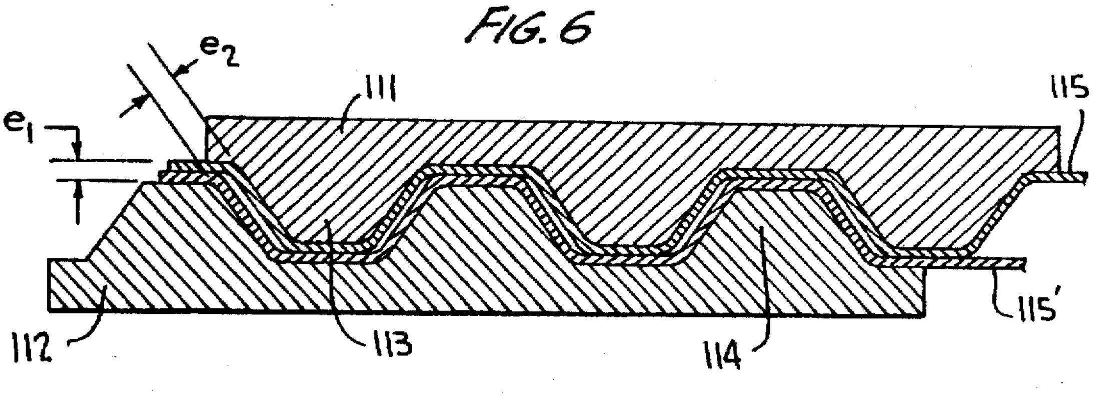
FIG. 6 is a cross-section along VI—VI of FIG. 5.

FIG. 6 is an enlarged view of a cross-section in a plane through the axis of the two cylinders 111 and 112. As shown in this figure, the two plies 115, 115' substantially hug the contours of protrusions 113 and 114 respectively.

The play between the two cylinders is e1 between the tops of the protrusions and the opposite engraving bottoms. The play is e2 at the slopes. In the invention, the play e1 is set in such a manner that it is at most equal to the thickness of the two plies so that, on one hand, adhesive bonding is assured at that location and, on the other hand, that there is calendering. Moreover, the protrusion geometry is determined in such a way that the ratio e1/e2 is between 0.8 and 1. In this manner, a sheet is formed with reduced air pockets.

A larger gap e2 is acceptable in the direction of machine advance in order to secure satisfactory rotation of the cylinders one against the other. Accordingly, in the direction of machine advance, the ratio e1/e2 is set in such a way that it ranges from 0.2 to 1. In particular, it is between 0.2 and 0.5.

Figure 7:
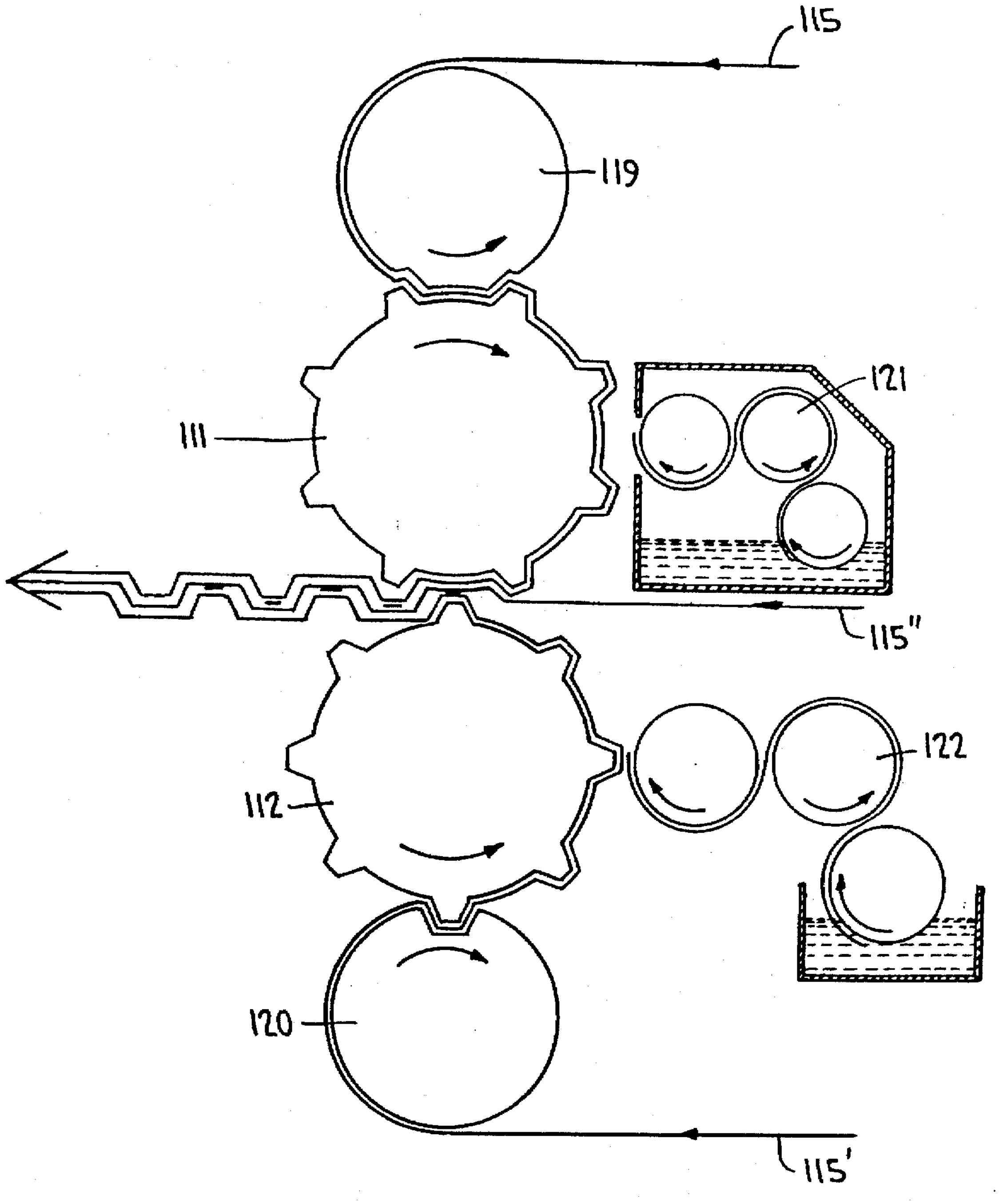
FIG. 7 is another embodiment with which to manufacture a three-ply web.

FIG. 7 shows an embodiment of a three-ply sheet. The equipment is similar to that of FIG. 5. Each common component is denoted by the same reference. This equipment comprises an additional glue applicator 122 and a paper feed 115".

Each glue applicator 121, 122 deposits an adhesive substance on at least some of the tops of the bosses of plies 115 and 115'. These plies are forced against metallic cylinders 111 and 112 by rubber cylinders 119, 120. The two plies 115, 115' are driven in the direction shown by the arrows as far as the meshing gap between the two cylinders 111 and 112. A third ply 115" is driven between the two plies 115, 115' when they engage in said gap.

With e1/e2 wherein e1 is less than or equal to the sum of the three ply thicknesses, the invention assures that the ply 115 is joined to ply 115" and that ply 115" is joined to ply 115'.

We claim:

1. A method of embossing a paper sheet composed of at least two piles comprising (1) engaging the at least two plies between a first metallic cylinder and a second metallic cylinder wherein each cylinder has protrusions extending radially therefrom and is driven in rotation, (2) meshing the protrusions of the first cylinder and the protrusions of the second cylinder with each other so as to provide a play e1 between tops of the protrusions on said first cylinder and an opposite surface of the second cylinder and further so as to provide a play e2 between slopes of two adjacent protrusions, wherein when e1 and e2 are determined in a transverse direction relative to advance of the paper sheet e1/e2 is between 0.8 and 1 and when e1 and e2 are determined in a direction of paper advance e1/e2 is between 0.2 and 1; and wherein at least one of said at least two plies is previously made to correspond in shape to a surface of one of said first cylinder or said second cylinder by applying said ply against said first cylinder or said second cylinder by means of a rubber-clad or an elastomer-clad cylinder.

2. Method of embossing according to claim 1 wherein when e1 and e2 are determined in the direction of paper advance e1/e2 is between 0.2 and 0.5.

3. Method of embossing according to claim 1 wherein the at least two plies are each separately applied by a rubber-clad or an elastomer-clad cylinder against one of the metallic cylinders.

4. Method for embossing according to claim 1 wherein an adhesive is deposited on at least a portion of tops of rise zones formed in said at least two plies before the at least two plies are engaged together between the first cylinder and the second cylinder.

5. Method for embossing according to claim 3 wherein an adhesive is deposited on at least a portion of tops of rise zones formed in said at least two plies before the at least two plies are engaged together between the first cylinder and the second cylinder.

6. Method of embossing according to claim 1 wherein the play e1 at most corresponds to a sum of thicknesses of the at least two plies composing the sheet.

7. Method of embossing according to claim 6 wherein protrusions present on said sheet exceed 12 per $cm^2$.

8. An embossed sheet of absorbent paper produced according to the method of claim 1 wherein said embossed sheet of absorbent paper composed of at least two plies comprises on each side of said at least two plies bosses alternating with recesses, said recesses of one side corresponding to the bosses of an opposite side, and wherein the sheet evinces a calendered surface at tops of the bosses.

9. Embossed sheet of absorbent paper according to claim 8 wherein said at least two plies are connected in a top zone of at least a portion of the bosses and air pockets are not formed between the at least two plies.

* * * * *